(12) United States Patent
Ho et al.

(10) Patent No.: US 11,706,271 B2
(45) Date of Patent: Jul. 18, 2023

(54) SCHEMES CAPABLE OF SYNCHRONIZING NATIVE CLOCKS AND AUDIO CODEC CLOCKS OF AUDIO PLAYING FOR BLUETOOTH WIRELESS DEVICES

(71) Applicant: Audiowise Technology Inc., Hsinchu (TW)

(72) Inventors: I-Ken Ho, Hsinchu (TW); Chih-Wei Sung, Hsinchu (TW); Wei-Chung Peng, Hsinchu (TW); Kuang-Hu Huang, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 0 days.

(21) Appl. No.: 17/234,811

(22) Filed: Apr. 20, 2021

(65) Prior Publication Data

US 2021/0243242 A1 Aug. 5, 2021

Related U.S. Application Data

(62) Division of application No. 16/404,746, filed on May 7, 2019, now abandoned.

(60) Provisional application No. 62/719,702, filed on Aug. 19, 2018.

(51) Int. Cl.
| | |
|---|---|
| *H04L 29/06* | (2006.01) |
| *H04L 65/60* | (2022.01) |
| *H04L 65/80* | (2022.01) |
| *H04W 84/10* | (2009.01) |
| *H04W 4/80* | (2018.01) |
| *H04R 3/04* | (2006.01) |

(52) U.S. Cl.
CPC ............. *H04L 65/60* (2013.01); *H04L 65/80* (2013.01); *H04R 3/04* (2013.01); *H04W 4/80* (2018.02); *H04W 84/10* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 7,925,214 B2 | 4/2011 | Weinans | |
| 8,041,066 B2 | 10/2011 | Solum | |
| 8,768,252 B2 | 7/2014 | Watson | |
| 10,244,307 B1* | 3/2019 | Tong | .......... H04R 1/1091 |
| 2004/0203389 A1* | 10/2004 | Kojima | ........ H04W 88/02 455/449 |
| 2012/0155670 A1* | 6/2012 | Rutschman | ........ H04M 1/6066 381/74 |
| 2019/0369947 A1 | 12/2019 | El-Hoiydi | |

FOREIGN PATENT DOCUMENTS

| | | |
|---|---|---|
| CN | 101053196 A | 10/2007 |
| CN | 108415685 A | 8/2018 |

* cited by examiner

*Primary Examiner* — Kouroush Mohebbi
(74) *Attorney, Agent, or Firm* — Winston Hsu

(57) ABSTRACT

A method utilized in a wireless device used to wirelessly receive and play audio information includes: receiving a data packet stream transmitted from an audio source; monitoring a data amount of at least one buffer of a memory of the wireless device; and tuning an audio clock frequency dedicated for playing audio samples if the data amount of the at least one buffer deviates from a specific data amount level.

12 Claims, 4 Drawing Sheets

SCHEMES CAPABLE OF SYNCHRONIZING NATIVE CLOCKS AND AUDIO CODEC CLOCKS OF AUDIO PLAYING FOR BLUETOOTH WIRELESS DEVICES

CROSS REFERENCE TO RELATED APPLICATIONS

This application is a division application of U.S. application Ser. No. 16/404,746, which was filed on May 7, 2019, which claims priority of U.S. provisional application Ser. No. 62/719,702 filed on Aug. 19, 2018, which is entirely incorporated herein by reference.

BACKGROUND OF THE INVENTION

1. Field of the Invention

The invention relates to clock synchronization between wireless devices, and more particularly to native and/or audio clock synchronization between Bluetooth wireless devices.

2. Description of the Prior Art

Generally speaking, for the slot-based Bluetooth wireless communication, a slave device such as a primary headset is arranged to receive a packet from a master device such as an audio source. However, the actual packet arrival timing for the slave device may be usually different from the ideal packet arrival timing. In addition, a frequency offset between native clocks of master and slave devices may occur. Further, the audio codec clocks for playing audio samples employed by the master and slave devices may be different. All of these result in a low or poor audio quality due to asynchronous Bluetooth clocks and asynchronous audio codec clocks for multiple Bluetooth wireless devices.

SUMMARY OF THE INVENTION

Therefore one of the objectives of the invention is to provide a method utilized in a wireless device used to wirelessly receive and play audio information, a method utilized in a wireless device to be used as a slave device to be wirelessly connected to a master device in a piconet, and corresponding wireless devices, to solve the above-mentioned problems.

According to embodiments of the invention, a method utilized in a wireless device used to wirelessly receive and play audio information is disclosed. The method comprises: receiving a data packet stream transmitted from an audio source; monitoring a data amount of at least one buffer of a memory of the wireless device; and tuning an audio clock frequency dedicated for playing audio samples if the data amount of the at least one buffer deviates from a specific data amount level.

According to the embodiments, a method utilized in a wireless device to be used as a slave device to be wirelessly connected to a master device in a piconet is disclosed. The method comprises: using a receiver circuit of the wireless device to receive a data packet stream transmitted from an audio source; and tuning a clock frequency generated from an oscillator of the wireless device according to at least one of a frequency offset generated from the receiver circuit of the wireless device and a reception time offset of the receiver circuit of the wireless device.

According to the embodiments, a Bluetooth wireless device used to wirelessly receive and play audio information is disclosed. The Bluetooth wireless device is to be used as a slave device to be wirelessly connected to a master device in a piconet, and the Bluetooth wireless device comprises a receiver circuit and a controlling circuit. The receiver circuit is used for receiving a data packet stream transmitted from an audio source. The controlling circuit is coupled to the receiver circuit and is used for monitoring a data amount of at least one buffer of a memory of the Bluetooth wireless device and tuning an audio clock frequency dedicated for playing audio samples if the data amount of the at least one buffer deviates from a specific data amount level.

According to the embodiments, a Bluetooth wireless device used as a slave device to be wirelessly connected to a master device in a piconet is disclosed. The Bluetooth wireless device comprises a receiver circuit and a controlling circuit. The receiver circuit is used for receiving a data packet stream transmitted from an audio source. The controlling circuit is coupled to the receiver circuit and is used for tuning a clock frequency generated from an oscillator of the Bluetooth wireless device according to at least one of a frequency offset generated from the receiver circuit of the Bluetooth wireless device and a reception time offset of the receiver circuit of the Bluetooth wireless device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
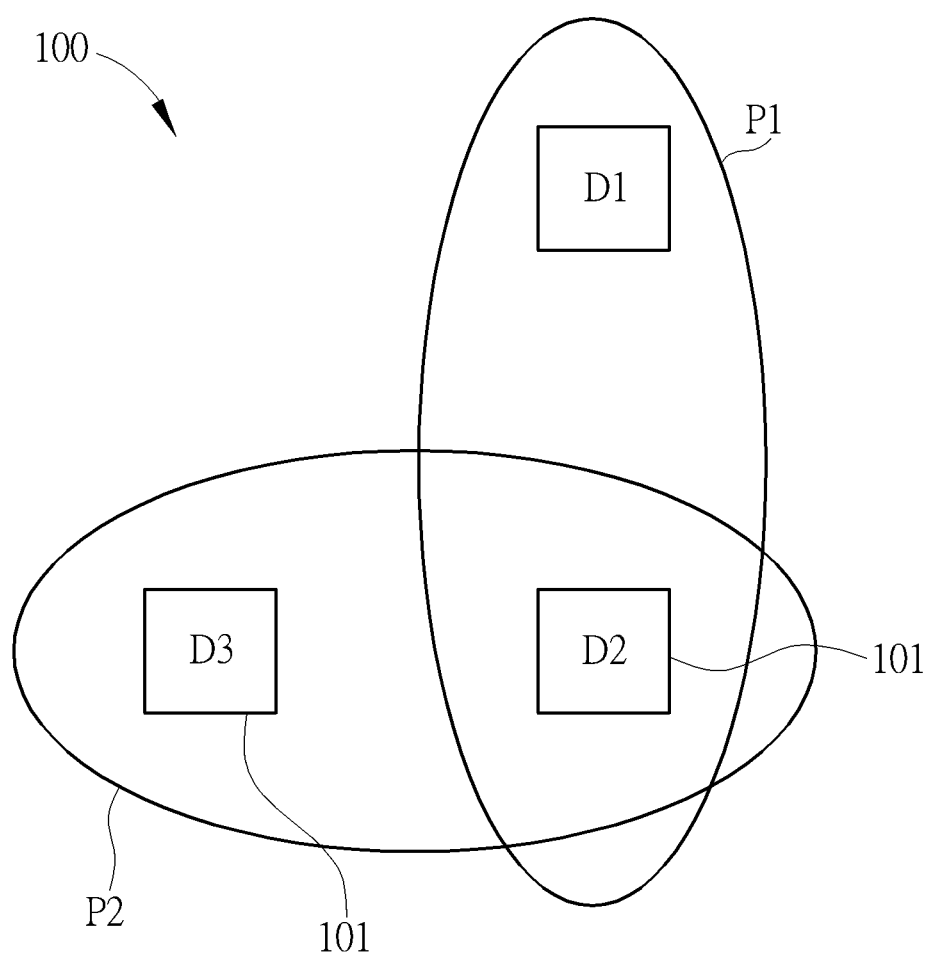
FIG. 1 is an overview block diagram of a wireless communication system such as a Bluetooth communication network according to an embodiment of the invention.

FIG. 1 is an overview block diagram of a wireless communication system 100 such as a Bluetooth communication network (but not limited) according to an embodiment of the invention. The system. 100 comprises an audio source D1 such as a mobile/wearable electronic device (e.g. a smart phone), a wireless device 101 used as a primary headset D2, and another wireless device 101 used as a secondary headset D3. The headsets D2 and D3 are for example earphones. The wireless device 101 is used to wirelessly receive and play audio information which is generated from the audio source D1.

The audio source D1 and the primary headset D2 are in the same piconet P1 in which the audio source D1 is a master device while the primary headset D2 is a slave device. The primary headset D2 is used to receive Bluetooth packet stream for example comprising Bluetooth audio packets generated from the audio source D1 through the piconet P1.

The primary headset D2 and the secondary headset D3 are in the same piconet P2 in which the primary headset D2 is a master device while the secondary headset D3 is a slave device. In addition, the number of secondary headsets in other embodiments may be two or more; this is not meant to be a limitation.

The secondary headset D3 can receive the audio packets via a variety ways. For example, the secondary headset D3 may join the piconet P1 to receive the audio packets directly from the audio source D1. Alternatively, the secondary headset D3 may receive the audio packets relayed by the primary headset D2 through the piconet P2. Alternatively, the secondary headset D3 may snoop the audio packets transmitted from the audio source D1 in the piconet P1. For instance, the primary headset D2 and secondary headset D3 are arranged to establish communications in the piconet P2, and the primary headset D2 can provide communication parameters for the secondary headset D3 so that the secondary headset D3 can snoop the piconet P1 or can receive the audio packets relayed by the primary headset D2 from the audio source D1.

Each Bluetooth wireless device 101 has its native clock generated from its oscillator as its local clock. For clock synchronization of each piconet, a master device of the wireless devices 101 is arranged to use its native clock as the Bluetooth clock in one piconet, and slave device of the wireless devices 101 is arranged to use the master device's native clock as its Bluetooth clock in the same piconet. Each of the slave devices is arranged to synchronize its native clock to a master wireless device's native clock, i.e. the Bluetooth clock of the piconet.

In addition, for time slot synchronization, the Bluetooth clock employed by a slave device is kept in synchronization with a master device's native Bluetooth clock by adding a clock offset into the native clock of the slave device wherein the clock offset is updated each time or periodically when a Bluetooth packet is received from the master device. That is, the slave device's Bluetooth clock is equal to the master device's native Bluetooth clock plus the clock offset.

Figure 2:
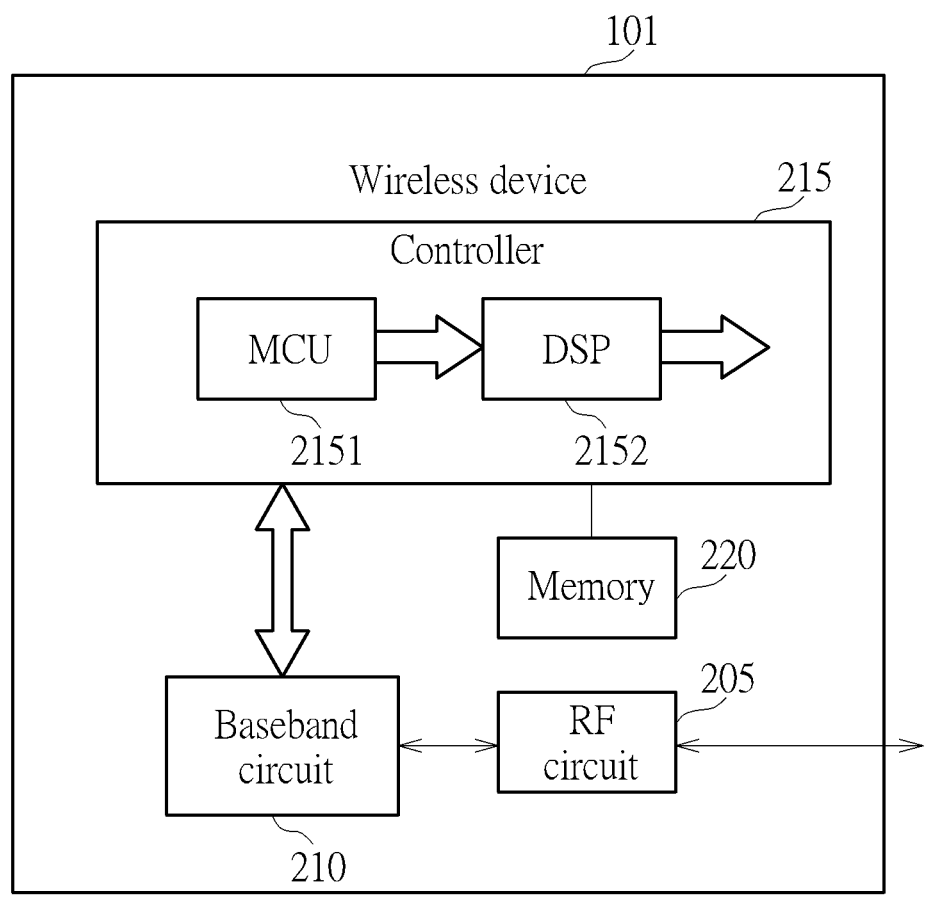
FIG. 2 is a block diagram of an example of a wireless device of FIG. 1 according to an embodiment of the invention.

FIG. 2 is a block diagram of an example of a wireless device 101 of FIG. 1 according to an embodiment of the invention. The wireless device 101 comprises an RF circuit 205, a baseband circuit 210, a controlling circuit 215, and a memory 220. The controlling circuit 215 such as a controller comprising a microcontroller (MCU) 2151 and a digital signal processing circuit (DSP) 2152. A receiver circuit of the wireless device 101 may comprise RF circuit 205 or a combination of RF circuit 205 and baseband circuit 210.

The memory 220 is divided and allocated to multiple buffers such as an audio packet buffer, a decoder buffer, and an audio codec buffer (not shown in FIG. 2). For implementation, in practice, the audio packet buffer may be embedded within the MCU 2151, and the decoder buffer and audio codec buffer may be embedded in the DSP 2152. However, this is not meant to be a limitation.

The RF circuit 205 is an RF transceiver used for receiving a radio signal corresponding to a data packet stream from an antenna (not illustrated) of wireless device 101 to generate a digital signal comprising packets.

The baseband circuit 210 is coupled to the RF circuit 205 and used for receiving and processing the digital packets in digital domain and then providing the processed digital packets for the controller 215.

A Bluetooth packet comprises a header and content information. The header may comprise higher layer header information and lower layer header information. For example, the baseband circuit 210 may be used to parse the header (e.g. the lower layer header information) of the Bluetooth packet to determine whether such Bluetooth packet is an SCO/eSCO packet or an ACL packet. For example, an SCO/eSCO packet is associated with a real-time narrow band signal which does not require retransmission. In this example, an SCO/eSCO packet comprises voice data in Bluetooth. The narrow band audio may be referred to as Bluetooth voice type. An ACL packet is associated with all other Bluetooth data transfer including High quality audio/video data. An example of an ACL packet is music playback through A2DP, and this is high bandwidth data.

If the Bluetooth packet is parsed or determined as an SCO/eSCO packet, the SCO/eSCO type Bluetooth packet is transmitted by the baseband circuit 210 to the decoder buffer. If the Bluetooth packet is parsed or determined as an ACL packet, the ACL type Bluetooth packet is transmitted by the baseband circuit 210 to a data packet buffer of MCU 2151.

MCU 2151 is used to parse the header (e.g. the higher layer header information) of the ACL type Bluetooth packet. If the ACL type Bluetooth packet is determined as an A2DP type Bluetooth packet, the A2DP type Bluetooth packet is transmitted from the data packet buffer to the audio packet buffer.

Further, it should be noted that the operation of parsing the header of a Bluetooth packet to determine whether such packet is a SCO/eSCO packet may be installed within the MCU 2151 of controller 215. That is, in one embodiment, the above-mentioned parsing operation is included by the controller 215 and excluded from the baseband circuit 210. However, this is not meant to be a limitation.

Figure 3:
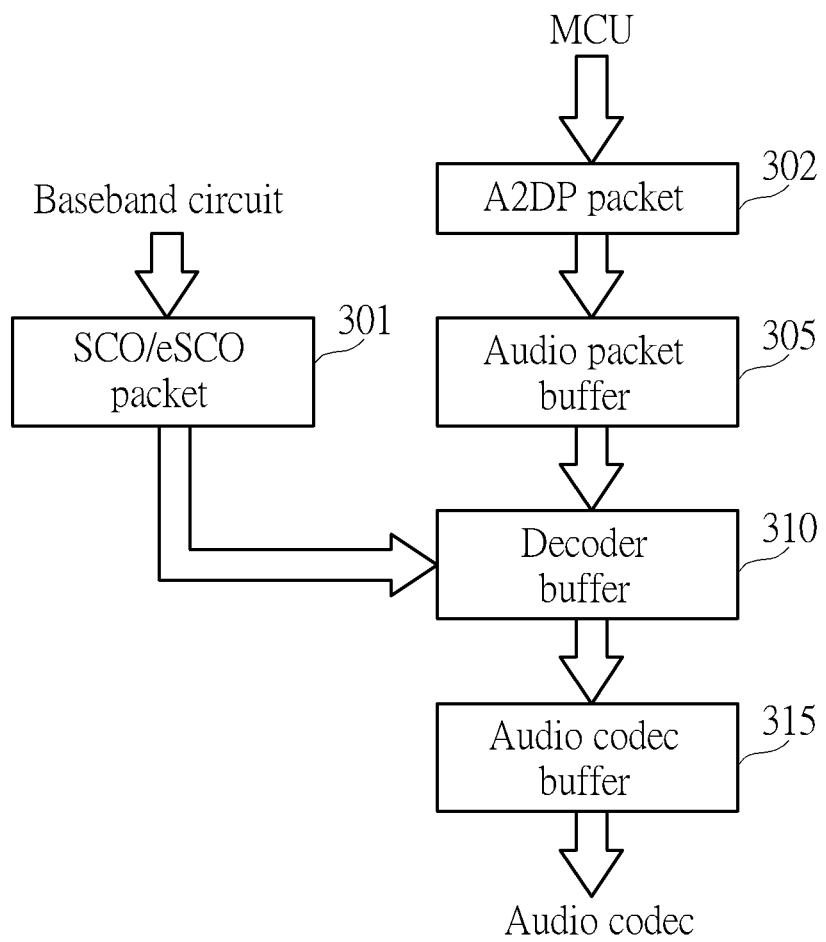
FIG. 3 is a block diagram of the operation of the controller for processing Bluetooth packet(s) to generate audio PCM (pulse code modulation) samples for an audio codec according to an embodiment of the invention.

FIG. 3 is a block diagram of the operation of the controller 215 for processing Bluetooth packet(s) to generate audio PCM (pulse code modulation) samples for an audio codec according to an embodiment of the invention. As shown in FIG. 3, an SCO/eSCO packet indicated by block 301 is transmitted from the baseband circuit 210, and then the SCO/eSCO packet is transmitted to the decoder buffer 310. DSP 2152 is arranged to process or parse/decode the content of the SCO/eSCO packet frames by frames to generate PCM samples and store the PCM samples into the audio codec buffer 315 for the audio codec for audio playing.

Alternatively, an A2DP packet is transmitted from the MCU 2151 to store the A2DP packet into the audio packet buffer 305, and then the A2DP packet is transmitted from MCU 2151 to DSP 2152 to store the A2DP packet into the decoder buffer 310. In this example, DSP 2152 is arranged to process or parse/decode the content of the A2DP packet frames by frames to generate PCM samples and store the PCM samples into the audio codec buffer 315 for the audio codec for audio playing.

Figure 4:
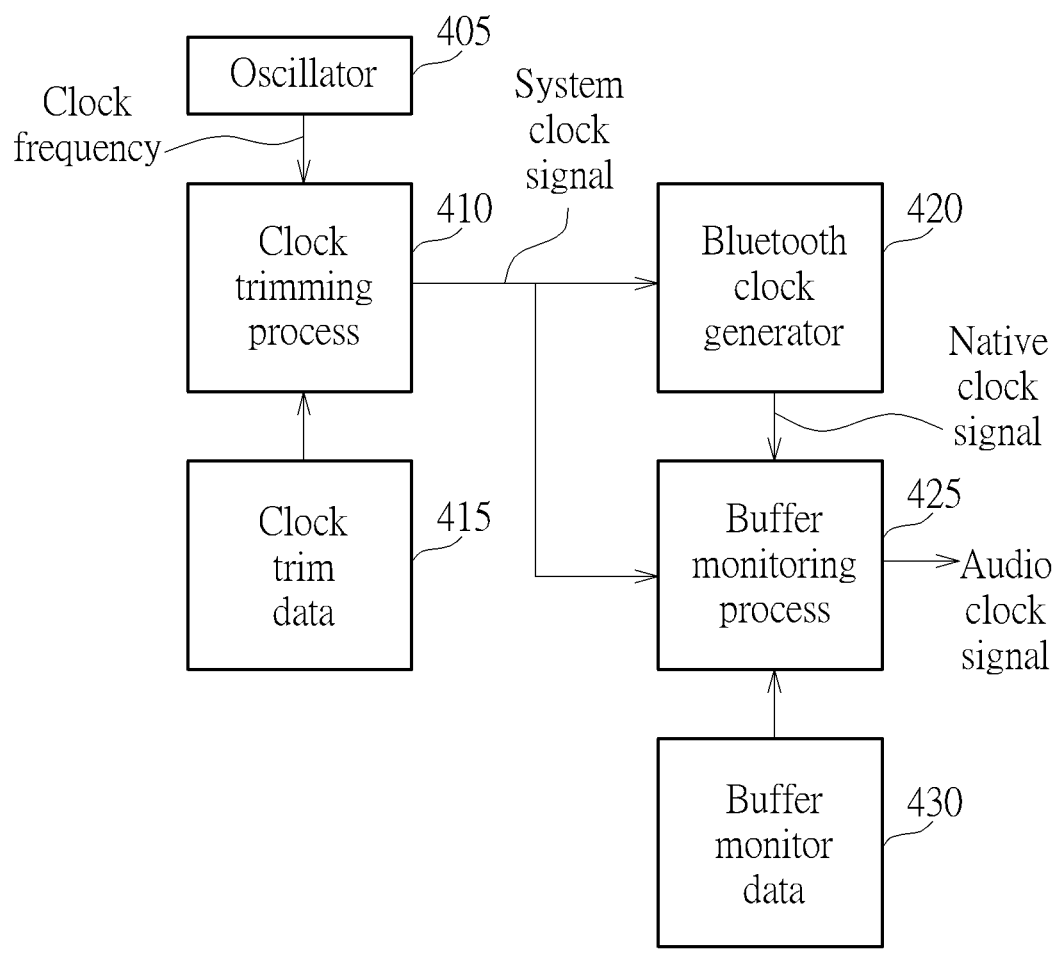
FIG. 4 is a diagram of block diagram illustrating audio play synchronization operation and functions of the wireless device in FIG. 1 according to an embodiment of the invention.

FIG. 4 is a block diagram illustrating audio play synchronization operation and functions of the wireless device 101 in FIG. 1 according to an embodiment of the invention. The wireless device 101 in the system 100 supports functions and operations of a clock trimming method/process and a buffer monitoring method/process. The clock trimming process 410 is arranged to perform a clock trimming/tuning operation upon a clock frequency generated from an oscillator 405 of the wireless device 101 based on clock trim data indicated by the block 415 to generate a system clock signal. The buffer monitoring process 425 is arranged to receive its native clock signal, generated from a clock generator 420 based on the system clock signal, to generate and tune an audio clock signal for audio playing based on buffer monitor data indicated by the block 430 and the system clock signal; the audio clock signal is used for playing audio PCM samples.

It should be noted that the clock trimming process 410 can be employed by the secondary headset D3 to track a clock signal of primary headset D2, and the buffer monitoring process 425 can be employed by the primary headset D2 to track audio signals/packets from the audio source D1. However, this is not intended to be a limitation of the invention. In addition, the primary headset D2 or secondary headset D3 can execute the clock trimming process 410 and/or the buffer monitoring process 425. The operation of clock trimming process 410 and operation of buffer monitoring process 425 can be separated and to be executed individually. The operation of buffer monitoring process 425 can be executed without the clock trimming process 410. For example, in one embodiment, the system clock signal as shown in FIG. 4 is generated from the clock frequency of oscillator 405 without frequency tuning of clock trimming process 410. Alternatively, in one embodiment, the audio clock signal can be generated from the system clock signal without tuning of the buffer monitoring process 425.

Based on the clock trimming process 410, a wireless device 101 if used as a slave device of a piconet, e.g. the secondary headset D3, can track a corresponding master device's native clock in such piconet and avoid a long-term accumulated packet arrival timing offset between the secondary headset D3 and such corresponding master device (e.g. primary headset D2) due to the variation between the native clocks.

In practice, for an embodiment of the clock trimming process 410, the wireless device 101 for example is used as the secondary headset D3 (but not limited), and MCU 2151 is used to tune a clock frequency generated from an oscillator (i.e. the clock frequency of oscillator 405 in FIG. 4) of RF circuit 205 of the wireless device 101 according to at least one of a frequency offset generated from the RF circuit 205 and a reception time offset of RF circuit 205. The clock trim data 415 of FIG. 4 comprises at least one of the frequency offset and the reception time offset.

For generating the reception time offset, the RF circuit 205 is arranged to be turned on earlier to receive the analog RF signal transmitted from the primary headset D2 that is used as a master device in the piconet P2. For example, the secondary headset D3 can negotiate with the primary headset D2 to know an ideal reception timing that is ready for receiving the analog RF signal. However, the actual reception timing starting to receive the analog RF signal may be different and may be earlier than or later than the ideal reception timing. Accordingly, the RF circuit 205 is arranged to be turned on earlier to receive the analog RF signal.

MCU 2151 is used to read the actual reception timing and the specified/ideal reception timing from the RF circuit 205 and to generate a frequency offset by comparing the actual reception timing of the RF circuit 205 of the wireless device 101 with the specified reception timing specified by or transmitted from the master device such as primary headset D2. Then MCU 2151 is arranged to tune the clock frequency generated from the oscillator 405 based on the generated frequency offset so as to synchronize the native clock of secondary headset D3 with that of primary headset D2.

Additionally, for generating the frequency offset, the MCU 2151 of the slave device is used to obtain or receive the frequency count number from the clock frequency of the oscillator in the slave device (i.e. the native clock of secondary headset D3) and a specified frequency count number of the master device (i.e. the native clock of the primary headset D2). Then MCU 2151 is arranged to generate a frequency offset by comparing the two frequency count numbers and to tune the clock frequency generated from the oscillator of the slave device based on the generated frequency offset so as to synchronize the native clock of the secondary headset D3 with that of the primary headset D2.

This provides or ensures a better user experience in a true wireless stereo produce device.

In addition, in some examples, since the secondary headset D3 synchronizes with the primary headset D2, therefore it is not necessary for secondary headset D3 to use the buffer monitoring process to adjust its audio clock based on the received audio packet from the audio source D1. However, this is not intended to be a limitation.

Further, it should be noted that the reception time offset may mean a long-term total/average packet arrival time offset between the specified/ideal packet reception timing and the actual packet reception timing. That is, the MCU 2151 can be arranged to calculate a long-term accumulated/average time offset to adjust or tune its native clock.

An advantage of the above-mentioned clock trimming process is to avoid a circumstance that audio data are played in different speed between two headsets.

For example, in an audio play scenario, it is assumed that the Bluetooth clock of the secondary headset D3 is zero ppm (parts per million) which means no offsets and the audio data such as music is played at 48 KHz (about 20.8 μs (microseconds) per sample). The native clock of the secondary headset D3 may be faster than the primary headset D2 and for example may always increase 2 ppm frequency offset each time. Thus, after one second, the secondary headset D3 may play the music 2 μs ahead corresponding to the music played by the primary headset D2. After 11 seconds, the secondary headset D3 may play the music 22 μs ahead corresponding to the music played by the primary headset D2. The secondary headset D3 plays the audio data too fast and is consuming one extra audio sample about every 10.42 seconds.

To solve this problem, MCU 2151 of the secondary headset D3 can employ the clock trimming process to trim or tune the generated native clock based on the frequency offset in the beginning to rapidly adjust the generated native clock to be synchronized with the native clock of the primary headset D2, i.e. the Bluetooth clock employed by the secondary headset D3. At first, the MCU 2151 identifies the frequency offset between the received packet from the primary headset D2 and its native clock and then trims its native clock based on the identified frequency offset.

In one embodiment, the MCU 2151 can gradually trim the generated native clock in several time slots to avoid too much frequency drop. For example, if the MCU 2151 determines to speed up the generated native clock 5 ppm, then MCU 2151 may speed up the clock 1 ppm in the next time slot and speed up the clock 2 ppm in a time slot after the next time slot, . . . , and so on. The MCU 2151 can trim the generated native clock so as to make the frequency offset/difference be less than 1 ppm.

Then MCU 2151 of the secondary headset D3 may employ the clock trimming process 410 to trim or tune the generated native clock based on the time reception offset (i.e. the long-term accumulated/average packet arrival time offset) to precisely adjust the native clock of secondary headset D3 to be synchronized with the native clock of the primary headset D2, i.e. the Bluetooth clock employed by secondary headset D3.

For example, the MCU 2151 of secondary headset D3 can accumulate or average the differences between actual packet arrival times and expected/ideal packet arrival times respectively for a sequence of packets to derive the time reception offset mentioned above.

Further, based on the buffer monitoring process, a wireless device 101 if used as a slave device, e.g. the primary headset D2, can employ the buffer monitoring process 425 to monitor if the audio data is played too fast or too slow compared to the received audio packets sent from a master device such as audio source D1 so as to appropriately tune an audio clock frequency of the primary headset D2. In addition, a wireless device 101 if used as a primary headset D2 in FIG. 1 can employ the result from the buffer monitoring process to adjust its audio clock frequency and pass corresponding parameter (s) to a secondary headset D3 to adjust the audio clock frequency of headset D3.

In practice, for an embodiment of the buffer monitoring process, the wireless device 101 for example is used as a slave device in a piconet, e.g. the primary headset D2 of piconet P1. The primary headset D2 is arranged to receive audio packets from audio source D1 and can employ the buffer monitoring process to adjust its audio clock corresponding to the reception speed of audio packets from the audio source D1.

As shown in FIG. 4, the Bluetooth clock generator 420 is used to generate a Bluetooth native clock signal based on the system clock signal. Then, the buffer monitoring process 425 is used to employ a sampling rate converter (SRC) to receive the system clock signal of primary headset D2, the Bluetooth native clock signal, and the buffer monitor data 430 to generate and tune the audio clock. The SRC means a circuit capable of offering high-resolution sampling rate adjustments. The SRC is controlled by the controller 215 which is arranged to determine the buffer monitor data based on a monitored status of at least one buffer such as the audio packet buffer, decoder buffer, and/or audio codec buffer. For example, the monitored status may be a monitored data amount of a buffer.

Please refer to FIG. 2 and FIG. 3 again. In practice, the controller 215 is used to monitor the data amount of at least one buffer of the memory 220 to correspondingly tune/trim an audio clock frequency (i.e. the audio code clock) for playing audio samples. If too much data is buffered in a buffer, the wireless device 101 as primary headset D2 is arranged to increase the audio play speed to offload and avoid buffer overflow.

For controlling the buffer(s), the DSP 2152 of controller 215 is arranged to read the audio codec buffer 315 to play audio and the DSP 2152 is used to move data from the decoder buffer 310 to the audio codec buffer 315 when the level of the data amount stored in the audio codec buffer 315 is lower than a first threshold. The DSP 2152 is used to retrieve data from the audio packet buffer 305 to the decoder buffer 310 when the level of data amount stored in the decoder buffer 310 is lower than a second threshold.

For receiving and playing music type data, the wireless device 101 as the primary headset D2 is used to receive A2DP packets and store these packets into the audio packet buffer 305. The MCU 2151 or DSP 2152 is used to monitor the audio packet buffer 305 to see if the audio packet buffer 305 has too much or too little audio data. If the audio packet buffer 305 stores too much data, a corresponding buffer monitor data is generated by the MCU 2151 or DSP 2152 and is sent to the SRC to slightly increase the audio clock frequency. If the audio packet buffer 305 stores too little data, a corresponding buffer monitor data is generated by the MCU 2151 or DSP 2152 and is sent to the SRC to slightly decrease the audio clock frequency.

As mentioned above, the audio packet buffer 305 in the memory 220 is used to buffer or temporarily store sequentially received audio packet(s) such as A2DP packets having information/content of music type data. In one embodiment, the controller 215 employs the MCU 2151 to periodically or real-timely monitor the data amount of the audio packet buffer 305 in a first time period/interval, calculate a first average value of a first data amount in the first time period, monitor the data amount of the audio packet buffer to calculate a second average value of a second data amount level in a second time period later than or following the first time period, and tune the audio clock frequency by comparing the first average value with the second average value to determine whether the monitored data amount deviates from a particular data amount.

For example, MCU 2151 is used for deriving a difference value between the first average value and the second average value, increasing the audio clock frequency if the difference value indicates that an absolute value of the difference value is higher than a threshold value as well as the second average value is higher than the first average value, and decreasing the audio clock frequency if the difference value indicates that the absolute value of the difference value is higher than the threshold value as well as the second average value is lower than the first average value. That is, the above first average value is used as a reference data amount, and when the second average value corresponding to later monitored data amount significant varies from the first average value, the MCU 2151 determines that the monitored data amount of audio packet buffer deviates from a reference data amount. In this situation, the MCU 2151 can tune the audio clock frequency dedicated for playing audio samples so as to control such data amount difference becomes smaller than the threshold data amount.

For receiving and playing speech type data, the wireless device 101 as the primary headset D2 is used to receive SCO/eSCO packets and store these packets into the decoder buffer 310. DSP 2152 is used to monitor at least one of the decoder buffer 310 and audio codec buffer 315 to see if at least one buffer has too much or too little audio data. If the at least one buffer stores too much data, a corresponding buffer monitor data is generated by the DSP 2152 and is sent to the SRC to slightly increase the audio clock frequency. If the at least one buffer stores too little data, a corresponding buffer monitor data is generated by the MCU 2151 or DSP 2152 and is sent to the SRC to slightly decrease the audio clock frequency.

For example, the audio codec buffer 315 in the memory 220 is used to buffer or temporarily store audio PCM samples of SCO/eSCO packet(s). The controller 215 is arranged to use the DSP 2152 to periodically monitor the data amount of the audio codec buffer 315 or may use the MCU 2151 to monitor the data amount of the audio codec buffer 315 to determine whether the data amount of audio codec samples in the audio codec buffer 315 deviates from a normal average data amount level/value.

In one example, DSP 2152 may decode an SCO/eSCO packet at a fixed time period such as 7.5 ms, and 128 PCM (Pulse Code Modulation) samples are generated. Equivalently the audio clock frequency for playing the samples is equal to 16 KHz. Accordingly, the data amount of audio samples of audio codec buffer 315 ideally is kept at a normal data amount level. If the difference between the real-time monitored data amount and the normal data amount level becomes larger than a threshold data amount, then DSP 2152 is arranged to determine that the audio clock frequency has a frequency offset and is arranged to tune/control the audio clock frequency at a neighborhood of a target frequency. For example, the real-time monitored data amount may vary between 127 samples and 129 samples; that is, the average number of samples is 128. In this situation, the DSP 2152 determines that the audio clock frequency has no frequency offsets. If the real-time monitored data amount significantly varies between 126 samples and 130 samples, then the DSP 2152 determines that the audio clock frequency has a frequency offset and correspondingly increases/decreases the audio clock frequency to control the tuned audio clock frequency at a target audio clock frequency as far as possible. In some examples, the DSP 2152 is arranged to gradually adjust the audio clock frequency. However, this is not meant to be a limitation. In addition, the maximum capacity of the audio codec buffer 315 can be designed as two times of 128 samples, i.e. 256 samples. This is also not meant to be a limitation.

In addition, when audio is to be played, the primary headset D2 sends initial information (packet number, anchor, and/or SRC) to the secondary headset D3, and both the headsets D2 and D3 enable the their audio codecs at the same timing to keep the initial audio timing between the left and right ears aligned. The primary headset D2 keeps monitoring the status of the at least one buffer to get tracking information and then passes to information to the secondary headset D3, and both headsets D2 and D3 apply the new setting at anchor point based on the native clock of the primary headset D2.

That is, before tuning the audio clock frequency, if the wireless device 101 is used as a primary headset D2 to be wirelessly connected to the audio source D1 and can be used to be wireless connected to the secondary headset D3, then the controller 215 is arranged to control the wireless device 101 to send audio clock trimming information from the wireless device 101 to the secondary headset D3 to control both of the wireless device 101 and the secondary headset D3 to adjust corresponding audio clock frequencies to the target audio clock frequency. Thus, both audio clock frequencies of the primary and secondary headsets D2 and D3 are simultaneously increased or decreased with the same adjustment amount, and the audio playing for the two devices is synchronized.

For a better user audio experience, it may be needed to keep the secondary headset D3 in a near perfect timing which is synchronized with the primary headset D2. It is proposed that the secondary headset D3 at first uses the clock trimming method to keep its native clock to be synchronized with the native clock of the primary headset D2.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method utilized in a wireless device to be used as a slave device to be wirelessly connected to a master device in a piconet, comprising:
using a receiver circuit of the wireless device to receive a data packet stream transmitted from an audio source; and
tuning a clock frequency generated from an oscillator of the wireless device according to a frequency offset generated from the receiver circuit of the wireless device;
wherein generation of the frequency offset used for tuning the clock frequency of the slave device is based at least partly on a specified frequency count number transmitted from the master device and received by the slave device.

2. The method of claim 1, further comprising:
generating the frequency offset by comparing a frequency count number of the receiver circuit of the wireless device with the specified frequency count number transmitted from the master device.

3. A Bluetooth wireless device used as a slave device to be wirelessly connected to a master device in a piconet, comprising:
a receiver circuit, used for receiving a data packet stream transmitted from an audio source; and
a controlling circuit, coupled to the receiver circuit, used for tuning a clock frequency generated from an oscillator of the Bluetooth wireless device according to at least one of a frequency offset generated from the receiver circuit of the Bluetooth wireless device and a reception time offset of the receiver circuit of the Bluetooth wireless device;
wherein generation of the frequency offset used for tuning the clock frequency of the slave device is based at least partly on a specified frequency count number transmitted from the master device and received by the slave device, and generation of the reception time offset is based at least partly on a specified reception timing that specifies a start time of receiving an analog radio-frequency (RF) signal from the master device and is transmitted from the master device and received by the slave device.

4. The Bluetooth wireless device of claim 3, wherein the controlling circuit is used for generating the frequency offset by comparing a frequency count number of the receiver circuit of the Bluetooth wireless device with the specified frequency count number transmitted from the master device.

5. The Bluetooth wireless device of claim 3, wherein the controlling circuit is used for generating the reception time offset by comparing a reception timing of the receiver circuit of the Bluetooth wireless device with the specified reception timing transmitted from the master device.

6. The Bluetooth wireless device of claim 5, wherein the reception time offset is an accumulated time offset between the reception timing of the receiver circuit of the slave device and the specified reception timing transmitted from the master device.

7. The Bluetooth wireless device of claim 5, wherein the reception time offset is an average time offset between the reception timing of the receiver circuit of the salve device and the specified reception timing transmitted from the master device.

8. The Bluetooth wireless device of claim 3, wherein before tuning the clock frequency according to the reception time offset, the controlling circuit tunes the clock frequency according to the frequency offset.

9. A method utilized in a wireless device to be used as a slave device to be wirelessly connected to a master device in a piconet, comprising:
using a receiver circuit of the wireless device to receive a data packet stream transmitted from an audio source; and
tuning a clock frequency generated from an oscillator of the wireless device according to a reception time offset of the receiver circuit of the wireless device;
wherein generation of the reception time offset is based at least partly on a specified reception timing that specifies a start time of receiving an analog radio-frequency (RF) signal from the master device and is transmitted from the master device and received by the slave device.

10. The method of claim 9, further comprising:

generating the reception time offset by comparing a reception timing of the receiver circuit of the wireless device with the specified reception timing transmitted from the master device.

11. The method of claim 10, wherein the reception time offset is an accumulated time offset between the reception timing of the receiver circuit of the slave device and the specified reception timing transmitted from the master device.

12. The method of claim 10, wherein the reception time offset is an average time offset between the reception timing of the receiver circuit of the slave device and the specified reception timing transmitted from the master device.

* * * * *